(12) United States Patent
Fries et al.

(10) Patent No.: US 11,375,665 B2
(45) Date of Patent: Jul. 5, 2022

(54) HARVEST HEADER WITH ADJUSTABLE TRANSVERSE CONVEYOR SCREW

(71) Applicant: DEERE & COMPANY, Moline, IL (US)

(72) Inventors: Christina Fries, Nohfelden (DE); Friedrich Lauer, Krähenberg (DE); Eric Loutz, Erching Guiderkirch (FR); Oliver Klein, Saarwellingen (DE); Lutz Bischoff, Nünschweiler (DE); Dirk Weichholdt, Woelfling-les-Sarreguemines (DE)

(73) Assignee: DEERE & COMPANY, Moline, IL (US)

( * ) Notice: Subject to any disclaimer, the term of this patent is extended or adjusted under 35 U.S.C. 154(b) by 194 days.

(21) Appl. No.: 16/695,619

(22) Filed: Nov. 26, 2019

(65) Prior Publication Data
US 2020/0163279 A1    May 28, 2020

(51) Int. Cl.
*A01D 43/08*    (2006.01)
*A01D 61/00*    (2006.01)

(52) U.S. Cl.
CPC ......... *A01D 43/086* (2013.01); *A01D 61/002* (2013.01)

(58) Field of Classification Search
CPC ............... A01D 43/086; A01D 61/002; A01D 41/1271; A01D 41/127; A01D 61/004; A01D 75/182
See application file for complete search history.

(56) References Cited

U.S. PATENT DOCUMENTS

| | | | | |
|---|---|---|---|---|
| 4,296,592 A | * | 10/1981 | McIlwain | A01D 61/008 198/511 |
| 4,344,271 A | | 8/1982 | Schlueter et al. | |
| 5,261,216 A | * | 11/1993 | Schumacher, II | A01D 75/182 56/14.4 |
| 6,584,755 B2 | * | 7/2003 | Holtkotte | A01D 43/085 56/10.2 B |
| 6,843,044 B2 | | 1/2005 | Loeb | |
| 7,082,742 B2 | | 8/2006 | Schrattenecker | |

(Continued)

FOREIGN PATENT DOCUMENTS

| | | |
|---|---|---|
| DE | 4021030 C2 | 10/1994 |
| EP | 0993766 A1 | 4/2000 |

(Continued)

OTHER PUBLICATIONS

European Search Report issued in counterpart application No. 19211296.9 dated Apr. 29, 2020 (07 pages).

*Primary Examiner* — Alicia Torres
*Assistant Examiner* — Matthew Ian Neal
(74) *Attorney, Agent, or Firm* — Taft Stettinius & Hollister LLP; Stephen F. Rost

(57) ABSTRACT

A harvest header for a harvesting machine includes a carrying frame, a mechanism for receiving or cutting harvest material from a field, a control device, a power-operated actuator operably controlled by the control device, and a transverse conveyor screw movably controlled between two or more positions. The position of the transverse conveyor screw is adjustably controlled by the actuator in order to transport the harvest material to a discharge opening. The control device independently controls the actuator based on at least one harvest material property.

19 Claims, 3 Drawing Sheets

(56) References Cited

U.S. PATENT DOCUMENTS

| | | | | |
|---|---|---|---|---|
| 7,520,117 | B2* | 4/2009 | Rieck | A01D 45/021 |
| | | | | 56/62 |
| 7,743,591 | B2* | 6/2010 | Meier | A01D 41/1271 |
| | | | | 56/14.6 |
| 9,820,434 | B2* | 11/2017 | McCrea | A01D 34/14 |
| 9,894,834 | B2* | 2/2018 | van Vooren | A01D 75/187 |
| 9,961,831 | B1* | 5/2018 | French, Jr. | A01D 41/127 |
| 10,299,435 | B2* | 5/2019 | Noll | A01D 41/127 |
| 2002/0174636 | A1* | 11/2002 | Calmer | A01D 45/021 |
| | | | | 56/14.5 |
| 2017/0245434 | A1* | 8/2017 | Jung | A01B 63/1006 |
| 2018/0271019 | A1 | 9/2018 | Noll | |

FOREIGN PATENT DOCUMENTS

| | | | |
|---|---|---|---|
| EP | 1738634 | A1 | 1/2007 |
| EP | 2119341 | A2 | 11/2009 |
| EP | 2803257 | A1 | 11/2014 |
| EP | 3628142 | A1 | 4/2020 |

\* cited by examiner

HARVEST HEADER WITH ADJUSTABLE TRANSVERSE CONVEYOR SCREW

RELATED APPLICATIONS

This application claims priority to German Patent Application Ser. No. 102018220337.7, filed Nov. 27, 2018, the disclosure of which is hereby incorporated by reference in its entirety.

FIELD OF THE DISCLOSURE

The present disclosure relates to a harvest header for a harvesting machine having a carrying frame, means for receiving or cutting harvest material from a field and a transverse conveyor screw which can be adjusted in terms of position by a power-operated actuator connected to a control device for transporting the harvest material to a discharge opening.

BACKGROUND

Conventional cutting mechanisms are used in agriculture as harvest headers for self-driving harvesting machines in grain harvesting, generally for combine harvesters, although they can also be used as a harvest header for field choppers, for example, when harvesting whole crop silage. Cutting mechanisms include a cutter bar, a reel which is arranged thereabove and a transverse conveyor screw which passes the cut harvest material to a slope conveyor of the combine harvester or collection conveyor of the field chopper. The reel serves to engage in the standing stock of the harvest material and to convey it backwards so that it can be cut by the cutter bar and gripped by the transverse conveyor which supplies it to a rear discharge opening of the cutting mechanism at which it is taken up by a slope conveyor and is introduced for further processing inside the combine harvester. A transverse conveyor screw is used as a transverse conveyor in many cutting mechanisms. Maize pickers and collectors for grass are also used with transverse conveyor screws for discharging the harvest material. The transverse conveyor screws generally comprise in their outer regions conveyor coils which are placed around a central pipe and which are provided in the central discharge region with controlled fingers.

A conventional transverse conveyor screw is supported so as to be able to be moved within specific limits in terms of height with respect to the frame of the harvest header so that it can be diverted upwards counter to the force of a spring, depending on the respective harvest material throughput (see e.g., DE 102 41 216 A1) or its path upwards is limited by a stop which can be moved upwards in a power-controlled manner in order to reverse after a harvest material blockage (see e.g., EP 1 738 634 A1), or the vertical or horizontal position of the transverse conveyor screw is predetermined in a power-controlled manner by an operator (see e.g., DE 40 21 030 C2).

In the prior art, there is consequently provision for the vertical position of the transverse conveyor screw to be determined (DE 40 21 030 C2) or to be limited in an upward direction (EP 1 738 634 A1). This consequently has the disadvantage that it cannot adapt its vertical position, or can adapt it only to a limited degree to the respective harvest material throughput so that the harvest material under unfavorable operating conditions (high local throughputs) may become jammed underneath the transverse conveyor screw. Moreover, it can be pressed downwards by resilient force (DE 102 41 216 A1), which has the disadvantage that relatively strong springs are required and no adaptation of the force to harvest material properties is enabled since some harvest material is softer than other harvest material and consequently requires different pressing forces for optimum transverse conveying.

SUMMARY

In the present disclosure, a harvest header for a harvesting machine is provided with a carrying frame, means or a mechanism for receiving or cutting harvest material from a field, and a transverse conveyor screw which can be adjusted in terms of position by means of a power-operated actuator which is connected to a control device in order to transport the harvest material to a discharge opening. The control device can be operated to control the actuator independently in accordance with at least one harvest material property.

In this manner, it is possible to adjust the vertical or horizontal position of the transverse conveyor screw in accordance with a harvest material property using the actuator, which facilitates the adjustment of a suitable position of the transverse conveyor screw.

The control device can be connected to and operated with an operator input device for inputting the type of harvest material or a sensor which is constructed in particular as a camera arrangement for identifying the type of harvest material in order to adjust the actuator in accordance with the type of harvest material input or identified.

Furthermore, the control device can be connected to and operated with a sensor for detecting a parameter which is influenced by the harvest material, e.g., the throughput, in order to adjust the actuator depending on the parameter detected. The sensor may be configured to detect at least one of the following parameters: contact pressure of the transverse conveyor screw on the harvest material, drive torque of the transverse conveyor screw, and throughput of the harvest header. The actuator may be a hydraulic cylinder and the sensor may detect the pressure in the hydraulic cylinder in order to sense the contact pressure of the transverse conveyor screw on the harvest material.

At both ends of the transverse conveyor screw there may be provided actuators which can be controlled separately and adjusted separately from each other in terms of position by the control device in the manner described above depending on a harvest material property of the respective part-width of the transverse conveyor screw.

The transverse conveyor screw may include at least two portions which are arranged laterally beside each other and which can be adjusted separately in terms of position by associated actuators by the control device in the manner described above depending on a harvest material property of the respective portion.

The transverse conveyor screw may be associated with a scraper which can be adjusted in terms of position together with the transverse conveyor screw, for which the actuator of the transverse conveyor screw or a separate actuator can be used.

The harvest header may be constructed in the form of a cutting mechanism, maize picker, collector or swath mower. In a cutting mechanism, a reel and a cutter bar are provided for receiving or cutting harvest material from a field. In a maize picker, picking units are provided as means for receiving or cutting harvest material from a field. In a collector, a collection drum is provided as means for receiving or cutting harvest material from a field and, in a swath mower, cutting devices are provided as means for receiving or cutting harvest material from a field.

The harvest header is used together with and coupled to a harvesting machine, which may be a combine harvester or a field chopper or a baler or a mowing vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
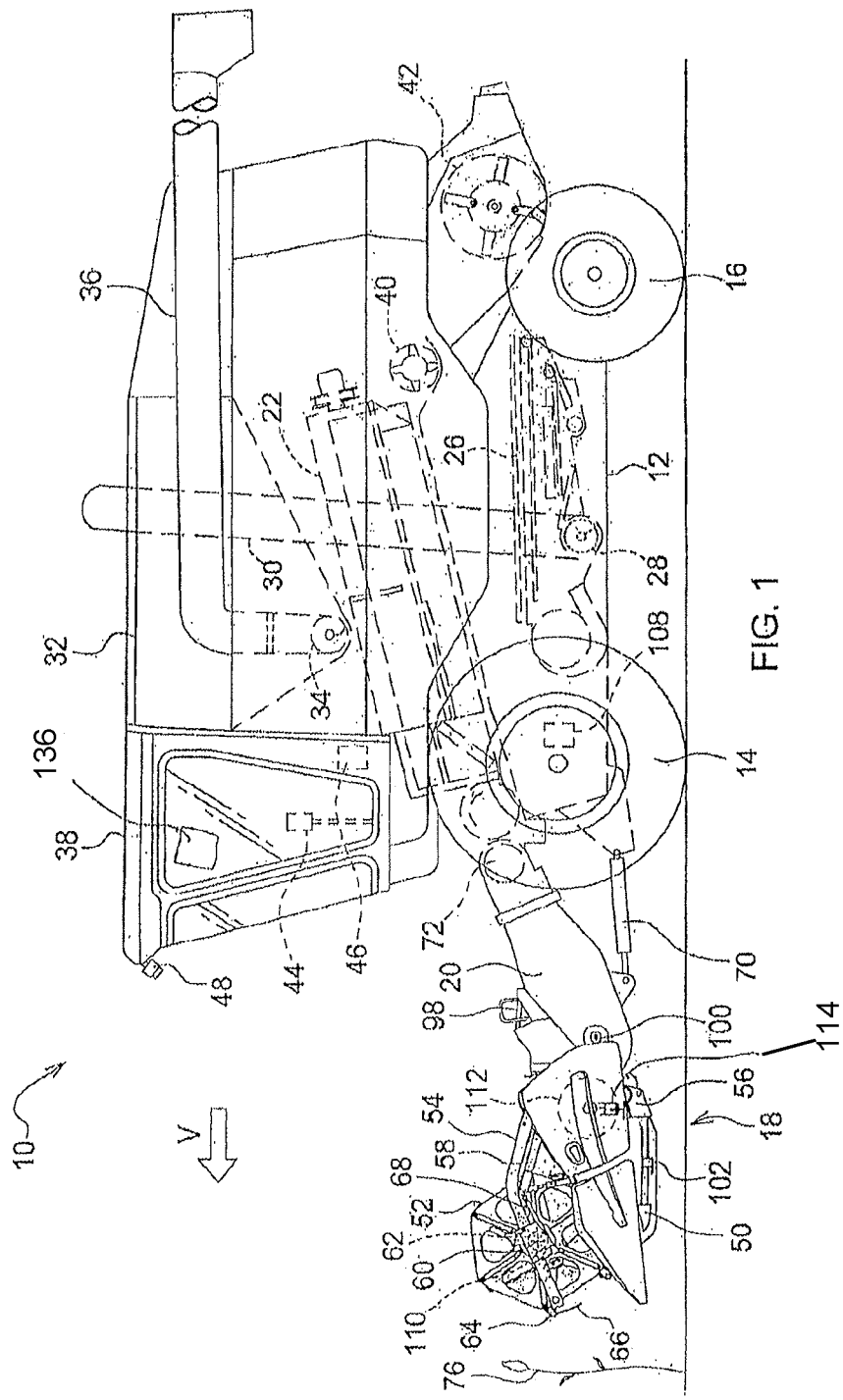
FIG. 1 is a side view of a self-driving combine harvester having a harvest header.
Figure 2:
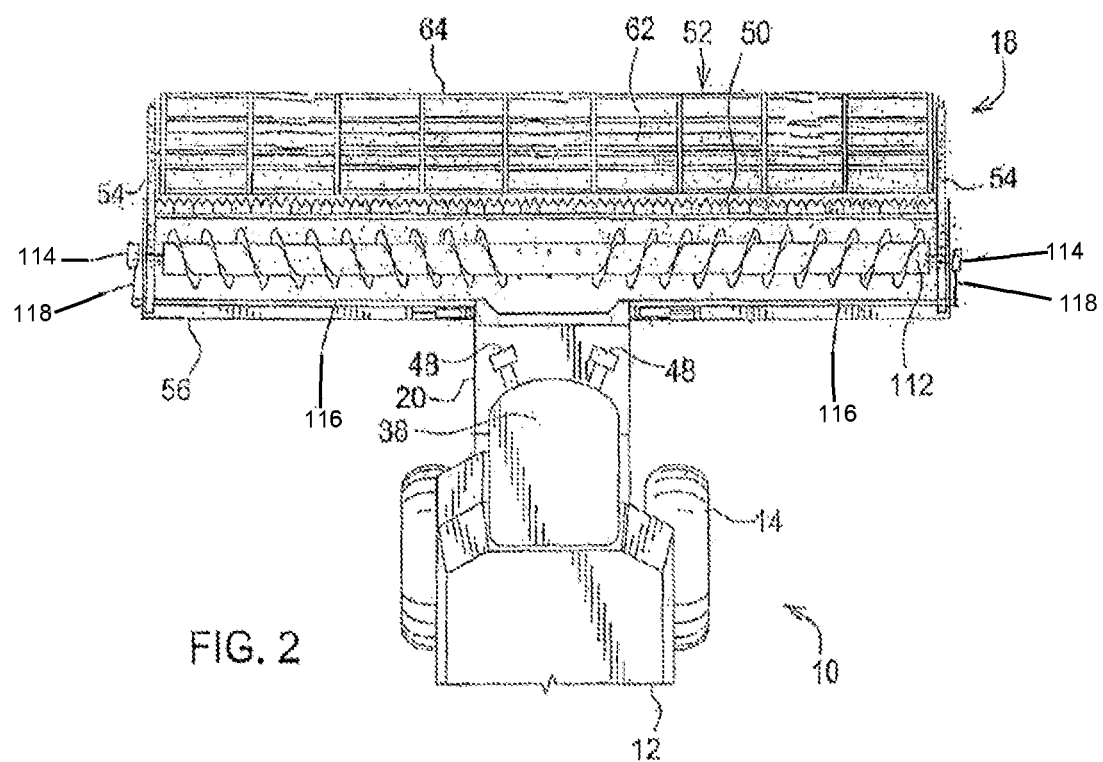
FIG. 2 is a plan view of the harvest header.
Figure 3:
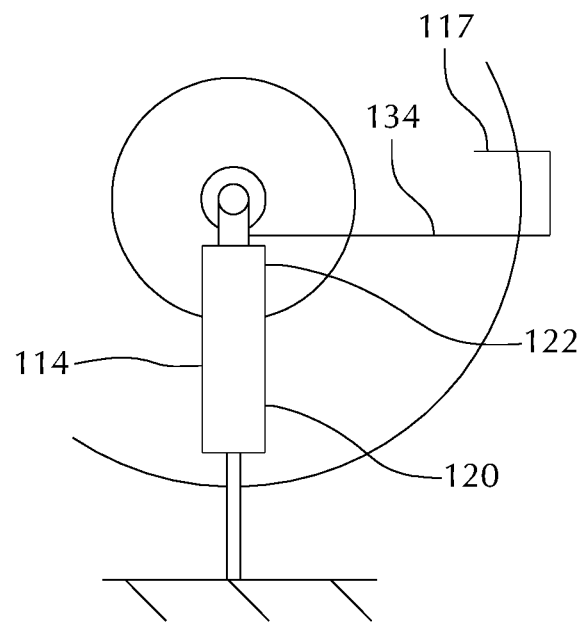
FIG. 3 is a schematic side view of the transverse conveyor screw and an actuator of the harvest header.
Figure 4:
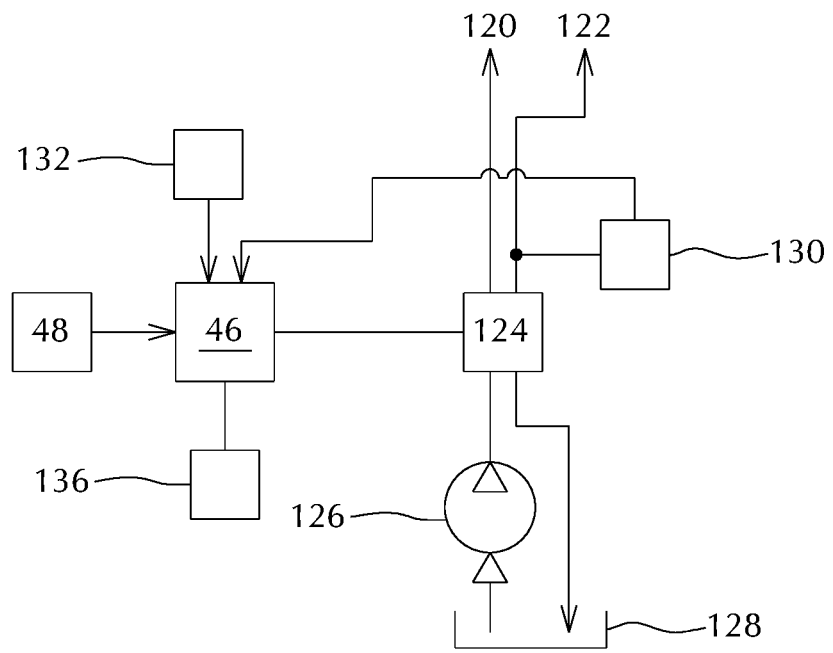
FIG. 4 is a diagram of the control device.

FIG. 1 shows an embodiment of a self-driving harvesting machine 10 in the form of a combine harvester. It comprises a load-bearing chassis 12 which is supported on the ground by means of drivable front wheels 14 and by means of steerable rear wheels 16, and which can be moved in a forward direction V over a field by the wheels 14, 16. The front wheels 14 and optionally the rear wheels 16 are rotated by a drive means or mechanism (not shown) in order to move the harvesting machine 10 over a field which is intended to be harvested. Below, the direction indications, such as front, rear or side, refer to the forward direction V of the harvesting machine 10 which extends in FIG. 1 to the left.

Harvesting Machine

On the front region of the harvesting machine 10, a harvest header 18 in the form of a cutting mechanism is releasably fitted in order to harvest during the harvesting operation a harvest material 76 in the form of grain or other threshable cereals from the field and to supply them upwards and backwards through a slope conveyor assembly 20 to an axial threshing assembly 22. The mixture of grain and other material which passes through threshing concaves or separation grids of the axial threshing assembly 22 reaches a cleaning device 26. Clean grain obtained from the cleaning device 26 is supplied by a grain screw 28 to a grain elevator 30, which conveys it to a grain tank 32. The clean grain in the grain tank 32 can be transferred by an unloading system having a transverse conveyor screw 34 and an unloading screw conveyor 36 to a transport vehicle. The residual harvest material which is discharged through the axial threshing assembly 22 is supplied by a conveyor drum 40 to a straw chopper 42, which chops it and distributes it over the width of the cutting mechanism over the field. The systems mentioned herein may be driven by a combustion engine and controlled by an operator in a cab 38. The shown axial threshing assembly 22 with one or more axial threshing and separating rotors is only one embodiment and can be replaced with a tangential threshing arrangement having one or more threshing drums and subsequent straw walkers or separation rotors.

Harvest Header

The harvest header 18 comprises a cutter bar 50 which moves back and forth and which extends substantially over the entire width of the harvest header 18. The cutter bar 50 may, as known to one skilled in the art, be rigid or flexible. A reel 52 is fitted to the harvest header 18 and extends substantially over the entire width of the harvest header 18 (or a part thereof). The outer ends of the reel 52 are supported on arms 54 of which only one is shown in FIG. 1. The arms 54 have rear ends which are articulated about axes which extend transversely relative to the forward direction on the frame 56 of the cutting mechanism 18, which also extends over the width of the harvest header 18, and from there extend in a forward direction. Each arm 54 is coupled to an actuator 58 in the form of a hydraulic cylinder, which is pivotably articulated to the frame 56 and to the arm 54. The arms 54 and consequently the reel 52 are lowered and raised by means of an adjustment (retraction and extension) of the actuator 58.

On a central pipe 62, which can be rotated by means of a controllable drive 110 during the harvesting operation (in FIG. 1 in the counter-clockwise direction), there are reel tine carriers 64 supported via reel arms 116 which extend radially with respect to the pipe 62. The carriers 64 may extend over the width of the harvest header 18 or a part thereof and to which reel tines 66 are fitted. A second actuator 68, in the form of a hydraulic cylinder, is adapted to adjust the horizontal position of the reel 52 by moving a support bearing of the pipe 62 along the arm 54. The harvest header 18 also comprises a transverse conveyor screw 112 in order to convey the harvest material cut by the cutter bar 50 to the center of the harvest header 18 and to supply it from there through a rear opening in the frame 56 to the slope conveyor 20. The height of the harvest header 18 over the base is defined by means of a fourth actuator 70 which pivots the slope conveyor 20 and consequently the harvest header 18 which is releasably secured thereto about a horizontal axis 72 which extends transversely relative to the forward direction with respect to the chassis 12 of the harvesting machine 10. The actuator 70 is controlled by an electronic control unit 46 based on an operator input via an operator interface 44 or independently, wherein the electronic control device 46 retains the harvest header 18 at a desired height above the ground or guides it over the ground at a desired pressure. As known in the art, the harvest header 18 may additionally pivot about an axis which extends horizontally in the forward direction in order to follow the ground contour, also in a manner controlled by the control device 46 and an associated actuator. An actuator 98 may control the inclination of the harvest header 18 about the transverse axis with respect to the slope conveyor 20.

The length of the cutting table can be controlled by an actuator 102. Accordingly, the horizontal position of the cutting bar 50 can be adjusted relative to the frame 56 of the harvest header 18 by the actuator 102, which is controlled by the operator interface 44 and the electronic control device 46. Possible embodiments of a harvest header 18 with a longitudinally adjustable cutting table are described in EP 2 803 257 A1 and WO 03/049532 A1.

The reel tine carriers 64 and consequently the reel tines 66 are rotatably supported with respect to the reel arms 116 which enables the reel tines 66 to be retained over the entire periphery around the pipe 62 in a desired, generally substantially vertical orientation. To this end, mechanisms which are known per se are used to control the rotational position of the reel tine carriers 64 with respect to the reel arms 116 depending on the rotation position of the reel arms 116 about the rotation axis of the pipe 62.

The control device 46 may additionally control an actuator 108 for predetermining the advance speed of the harvesting machine 10 which may additionally be controllable by a driving lever 44. The control device 46 is connected to a camera arrangement 48 which monitors the harvest header 18 and the field located in front. The control of the actuators 58, 68, 98, 102, 70, 108, 110 can be carried out by an operator interface 136 (i.e., operator input) or automatically, for which reference may be made to the disclosure of DE 10 2018 206 507 A1 and the prior art cited therein.

Displacement of the Position of the Transverse Conveyor Screw

The transverse conveyor screw 112 is connected at both ends to an actuator 114 which is used for active, power-operated adjustment of the vertical position of the transverse conveyor screw 112. The actuator 114 is constructed as a dual-action hydraulic cylinder, although it would also be conceivable to use a single-action embodiment which acts from above on the transverse conveyor screw 112. It would also be possible to use an electromagnetically or pneumatically adjusted actuator 114.

As can be seen in FIGS. 1 to 4, the actuators 114 are connected to a valve unit 124 which is controlled by a control device 46. The valve unit 124 is connected to a storage container 128 for hydrofluid and by separate lines to both chambers 120, 122 of the actuator 114. A pressure sensor 130 detects the pressure in the piston rod chamber 122 of the hydraulic cylinder and is connected to the control device 46. A torque sensor 132 detects the drive torque of a rotary drive of the transverse conveyor screw 112 and transmits its signal to the control device 46. The torque sensor 132 can detect the pressure in a hydrostatic drive of the transverse conveyor screw 112 or be inserted in a mechanical drive train of the transverse conveyor screw 112.

The transverse conveyor screw 112, which can be adjusted in terms of height by the actuator 114, is mechanically coupled by a connection element 134 to a scraper 117 which is located on the rear wall of the harvester head 18. When the transverse conveyor screw 112 is accordingly moved up or down by the actuator 114, the scraper 117 also moves up or down. In order to adjust the scraper 117, it would also be possible to use a separate actuator (not shown) which is controlled synchronously with the actuator 114.

The operating method of the position control of the transverse conveyor screw 112 according to the present disclosure is such that the control device 46 detects the throughput which is currently intended to be conveyed by the transverse conveyor screw 112, for which it uses one or more of the following sensors: camera arrangement 48, torque sensor 132 or pressure sensor 130. The camera arrangement 48 detects the height and density of the stock in front of the harvest header 18 using a suitable image processing software item which enables estimation or calculation of the anticipated throughput of the transverse conveyor screw 112. The torque sensor 132 detects the current torque with which the transverse conveyor screw 112 is driven and which is a measurement for the harvest material throughput of the transverse conveyor screw. The pressure sensor 130 detects the pressure in the piston rod chamber 122 of the actuator 114, that is to say, the pressure at which the actuator 114 presses the transverse conveyor screw 112 onto the harvest material and which is also a measurement for the throughput of the transverse conveyor screw 112.

The control device 46 controls the valve device 124 during operation in such a manner that the transverse conveyor screw 112 is moved by the actuator 114 (where applicable using another sensor in order to detect the position of the actuator 114, not shown in the Figures) into a position which is appropriate for the current throughput or in which the transverse conveyor screw 112 acts with appropriate pressure on the harvest material. The transverse conveyor screw 112 will accordingly with smaller throughputs be located in a lower position than with larger throughputs. The contact pressure of the transverse conveyor screw 112 may with larger throughputs be (where applicable under or over proportionally) larger than with smaller throughputs in order to achieve the required transverse conveying. In this instance, a suitable proportional or non-proportional connection between throughput and pressure may be stored in the control device 46 and used to control the actuator 114. In another embodiment, the pressure in the actuator 114 is kept constant and is optionally dependent only on the type of harvest material.

In addition, by means of an operator input device 136, the type of harvest material can be input and the control device 46 can control the position or support force of the transverse conveyor screw 112 depending on the type of harvest material. The type of harvest material may also be identified by the camera arrangement 48. The input or identified type of harvest material may also be used by the control unit 46 for controlling other adjustments of the harvesting machine 10, for example, for the thresher assembly 22 or the cleaning device 26. The throughput established by the control device 46 to control the actuator 114 can also be used to control the advance speed of the harvesting machine 10 by the actuator 108, and also to control other adjustments of the harvesting machine 10, for example, for the thresher assembly 22 or the cleaning device 26.

The control of the actuators 114 at both ends of the transverse conveyor screw 112 may be identical. However, it may be different, depending on the harvest material properties on both halves of the transverse conveyor screw 112. The transverse conveyor screw 112 could also be divided into a plurality of portions which are arranged laterally beside each other and the position could be adjusted separately by associated actuators 114, where applicable differently at both ends.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A harvest header for a harvesting machine, comprising:
a carrying frame;

a mechanism for receiving or cutting harvest material from a field;
a control device;
at least one power-operated actuator operably controlled by the control device; and
a transverse conveyor screw comprising two or more positions, a position of the transverse conveyor screw being adjustably controlled by the at least one power-operated actuator;
wherein, the transverse conveyor screw is configured to transport the harvest material to a discharge opening;
wherein, the control device operably controls the at least one power-operated actuator independently based on at least one harvest material property;
wherein, the at least one power-operated actuator includes actuators positioned at both ends of the transverse conveyor screw; and
wherein, the actuators positioned at both ends of the transverse conveyor screw are controlled separately.

2. The harvest header of claim 1, wherein the control device is operably connected to an operator input device, the control device receiving the type of harvest material therefrom and adjusting the at least one power-operated actuator in response to the type of harvest material.

3. The harvest header of claim 1, further comprising a sensor operably connected to the control device, the sensor configured to detect the type of harvest material and communicate the same to the control device for adjusting the at least one power-operated actuator.

4. The harvest header of claim 1, further comprising a sensor operably connected to the control device, the sensor configured to detect a parameter influenced by the harvest material.

5. The harvest header of claim 4, wherein the control device receives the parameter from the sensor and adjusts the at least one power-operated actuator accordingly.

6. The harvest header of claim 4, wherein the sensor is configured to detect a contact pressure of the transverse conveyor screw on the harvest material, a drive torque of the transverse conveyor screw, or a throughput of the harvest header.

7. The harvest header of claim 4, wherein:
the at least one power-operated actuator comprises a hydraulic cylinder; and
the sensor detects a pressure in the hydraulic cylinder.

8. The harvest header of claim 1 wherein positions of the actuators positioned at both ends of the transverse conveyor screw are adjusted separately from one another based on a harvest material property of a respective part-width of the transverse conveyor screw.

9. The harvest header of claim 1, wherein the transverse conveyor screw comprises at least two portions arranged laterally beside each other.

10. The harvest header of claim 9, wherein the two portions are adjusted independently of one another based on the position of each power-operated actuator depending on a harvest material property of the respective portion.

11. The harvest header of claim 1, wherein the transverse conveyor screw is coupled to a scraper, the scraper being adjusted in terms of position with the transverse conveyor screw.

12. A harvesting machine, comprising:
a chassis;
a plurality of wheels for supporting the chassis;
a harvest header coupled to the chassis, the harvest header comprising a carrying frame, a mechanism for receiving or cutting harvest material from a field, a control device, and a power-operated actuator operably controlled by the control device; and
a transverse conveyor screw comprising two or more positions, a position of the transverse conveyor screw being adjustably controlled by the power-operated actuator;
a sensor operably connected to the control device, the sensor configured to detect a parameter influenced by the harvest material;
wherein, the transverse conveyor screw is configured to transport the harvest material to a discharge opening;
wherein, the control device operably controls the power-operated actuator independently based on at least one harvest material property; and
wherein the sensor is configured to detect a contact pressure of the transverse conveyor screw on the harvest material a drive torque of the transverse conveyor screw, or a throughput of the harvest header.

13. The harvesting machine of claim 12, wherein the harvest header comprises a cutting mechanism, maize picker, collector or swath mower.

14. The harvesting machine of claim 12, wherein the sensor is configured to detect the type of harvest material and communicate the same to the control device for adjusting the power-operated actuator.

15. The harvesting machine of claim 12, wherein the control device receives the parameter influenced by the harvest material from the sensor and adjusts the power-operated actuator accordingly.

16. A harvest header for a harvesting machine, comprising:
a carrying frame;
a mechanism for receiving or cutting harvest material from a field;
a control device;
a plurality of power-operated actuators operably controlled by the control device; and
a transverse conveyor screw comprising two or more positions, a position of the transverse conveyor screw being adjustably controlled by the plurality of power-operated actuators;
wherein, the transverse conveyor screw is configured to transport the harvest material to a discharge opening;
wherein, the control device operably controls the plurality of power-operated actuator independently based on at least one harvest material property;
wherein, the transverse conveyor screw comprises at least two portions arranged laterally beside each other; and
wherein, the two portions of the transverse conveyor screw are adjusted independently of one another based on the position of each power-operated actuator depending on a parameter of the respective portion influenced by the harvest material.

17. The harvest header of claim 16, further comprising a sensor operably connected to the control device, the sensor configured to detect the parameter influenced by the harvest material of the respective portion; and
wherein, the control device receives the parameter influenced by the harvest material from the sensor and adjusts the plurality of power-operated actuators accordingly.

18. The harvesting machine of claim 12, wherein the sensor is configured to detect a drive torque of the transverse conveyor screw.

19. The harvesting machine of claim 12, wherein the sensor is configured to detect a throughput of the harvest header.

\* \* \* \* \*